(12) United States Patent
Filippo et al.

(10) Patent No.: US 7,165,167 B2
(45) Date of Patent: Jan. 16, 2007

(54) LOAD STORE UNIT WITH REPLAY MECHANISM

(75) Inventors: Michael A. Filippo, Manchaca, TX (US); James K. Pickett, Austin, TX (US); Benjamin T. Sander, Austin, TX (US); Rama S. Gopal, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 475 days.

(21) Appl. No.: 10/458,457

(22) Filed: Jun. 10, 2003

(65) Prior Publication Data

US 2004/0255101 A1    Dec. 16, 2004

(51) Int. Cl.
*G06F 9/24* (2006.01)
(52) U.S. Cl. ...................................... 712/225
(58) Field of Classification Search ................ 712/225, 712/216; 703/22
See application file for complete search history.

(56) References Cited

U.S. PATENT DOCUMENTS

| 5,581,719 | A | 12/1996 | Steely, Jr. et al. | 712/207 |
| 6,651,161 | B1* | 11/2003 | Keller et al. | 712/216 |
| 6,687,809 | B1* | 2/2004 | Chowdhury et al. | 712/216 |
| 6,691,222 | B1* | 2/2004 | Janik et al. | 712/219 |
| 6,792,446 | B1* | 9/2004 | Merchant et al. | 718/108 |

FOREIGN PATENT DOCUMENTS

WO    01/50253    7/2001
WO    02/42902    5/2002

OTHER PUBLICATIONS

International Search Report and Written Opinion, PCT/US2004/017096, mailed Aug. 30, 2004, 11 pages.
Mikko H. Lipasti, et al., "Exceeding the Dataflow Limit via Value Prediction," Proceedings of the 29th Annual ACM/IEEE International Symposium on Microarchitecture, Dec. 2-4, 1996, 12 pages.
David M. Gallagher, et al., "Dynamic Memory Disambiguation Using he Memory Conflict Buffer," Appeared in ASPLOS-VI Proceedings, Oct. 1994, 13 pages.
Mikko H. Lipasti, et al., "Value Locality and Load Value Prediction," Reprint of paper to appear in ASPLOS-VII, Oct. 1996, 10 pages.
Glenn Reinman, et al., "Predictive Techniques for Aggressive Load Speculation," Published in the Proceedings of the Annual 31st International Symposium on Microarchitecture, Dec. 1998, 11 paes.

* cited by examiner

*Primary Examiner*—Eric Coleman
(74) *Attorney, Agent, or Firm*—Robert C. Kowert; Meyertons, Hood, Kivlin, Kowert & Goetzel, P.c.

(57) ABSTRACT

A microprocessor may include a scheduler configured to issue operations and a load store unit configured to execute memory operations issued by the scheduler. The load store unit is configured to store information identifying memory operations issued to the load store unit. In response to detection of incorrect data speculation for one of the issued memory operations, the load store unit is configured to replay at least one of the issued memory operations by providing an indication to the scheduler. The scheduler is configured to responsively reissue the memory operations identified by the load store unit.

18 Claims, 6 Drawing Sheets

LOAD STORE UNIT WITH REPLAY MECHANISM

BACKGROUND OF THE INVENTION

1. Field of the Invention

This invention is related to the field of microprocessors and, more particularly, to performing data speculation in a microprocessor.

2. Description of the Related Art

Superscalar microprocessors achieve high performance by executing multiple instructions concurrently and by using the shortest possible clock cycle consistent with their design. However, data and control flow dependencies between instructions may limit how many instructions may be issued at any given time. As a result, some microprocessors support speculative execution in order to achieve additional performance gains.

One type of speculation is control flow speculation. Control flow speculation predicts the direction in which program control will proceed. For example, branch prediction may be used to predict whether a branch will be taken. Many types of branch prediction are available, ranging from methods that simply make the same prediction each time to those that maintain sophisticated histories of the previous branches in the program in order to make a history-based prediction. Branch prediction may be facilitated through hardware optimizations, compiler optimizations, or both. Based on the prediction provided by the branch prediction mechanism, instructions may be speculatively fetched and executed. When the branch instruction is finally evaluated, the branch prediction can be verified. If the prediction was incorrect, any instructions that were speculatively executed based on the incorrect predication may be quashed.

Another type of speculation is data speculation, which predicts data values. Proposed types of data speculation include speculatively generating addresses for memory operations and speculatively generating data values for use in computational operations. As with control speculation, the underlying conditions used to speculative generate a value are eventually evaluated, allowing the speculation to be verified or undone.

Since speculation allows execution to proceed without waiting for dependency checking to complete, significant performance gains may be achieved if the performance gained from correct speculations exceeds the performance lost to incorrect speculations. Decreasing the performance penalties due to incorrect speculations is therefore desirable.

SUMMARY

Various embodiments of methods and systems for replaying operations in a load store unit of a data-speculative microprocessor are disclosed. In some embodiments, a microprocessor may include a scheduler configured to issue operations and a load store unit configured to execute memory operations issued by the scheduler. The load store unit is configured to store information identifying memory operations issued to the load store unit. In response to detection of incorrect data speculation for one of the issued memory operations, the load store unit is configured to provide a replay indication to the scheduler indicating that at least one of the issued memory operations within the load store unit should be reissued. The scheduler is configured to responsively reissue the memory operations identified by the load store unit.

In one embodiment, the load store unit may be configured to replay each of the memory operations having an address matching the address of the incorrectly speculated memory operation. The load store unit may also (or alternatively) be configured to replay each of the memory operations having an address matching a speculative address of the incorrectly speculated memory operation. In one embodiment, the load store unit may only replay load operations whose address matches the address of the incorrectly speculated memory operation. In some embodiments, the load store unit may track which load operations have forwarded data from store operations, and if the address of a store operation is incorrectly speculated, the load store unit may replay any younger load operations that forwarded data from that store operation. The load store unit may also be configured to replay the memory operation for which incorrect data speculation was detected in some situations.

In some embodiments, the load store unit may be configured to detect incorrect data speculation by comparing a speculative value of the address of the memory operation to a new value of the address of the memory operation and/or by comparing a speculative result of the memory operation to a non-speculative result of the memory operation.

Various embodiments of a method may involve: issuing an operation to a load store unit for execution; the load store unit receiving an indication that data speculation performed on the operation is incorrect; in response to the indication, the load store unit generating a replay indication identifying at least one operation that is outstanding within the load store unit; and the scheduler responsively reissuing the operation(s) identified by the replay indication.

BRIEF DESCRIPTION OF THE DRAWINGS

A better understanding of the present invention can be obtained when the following detailed description is considered in conjunction with the following drawings, in which.

Figure 1:
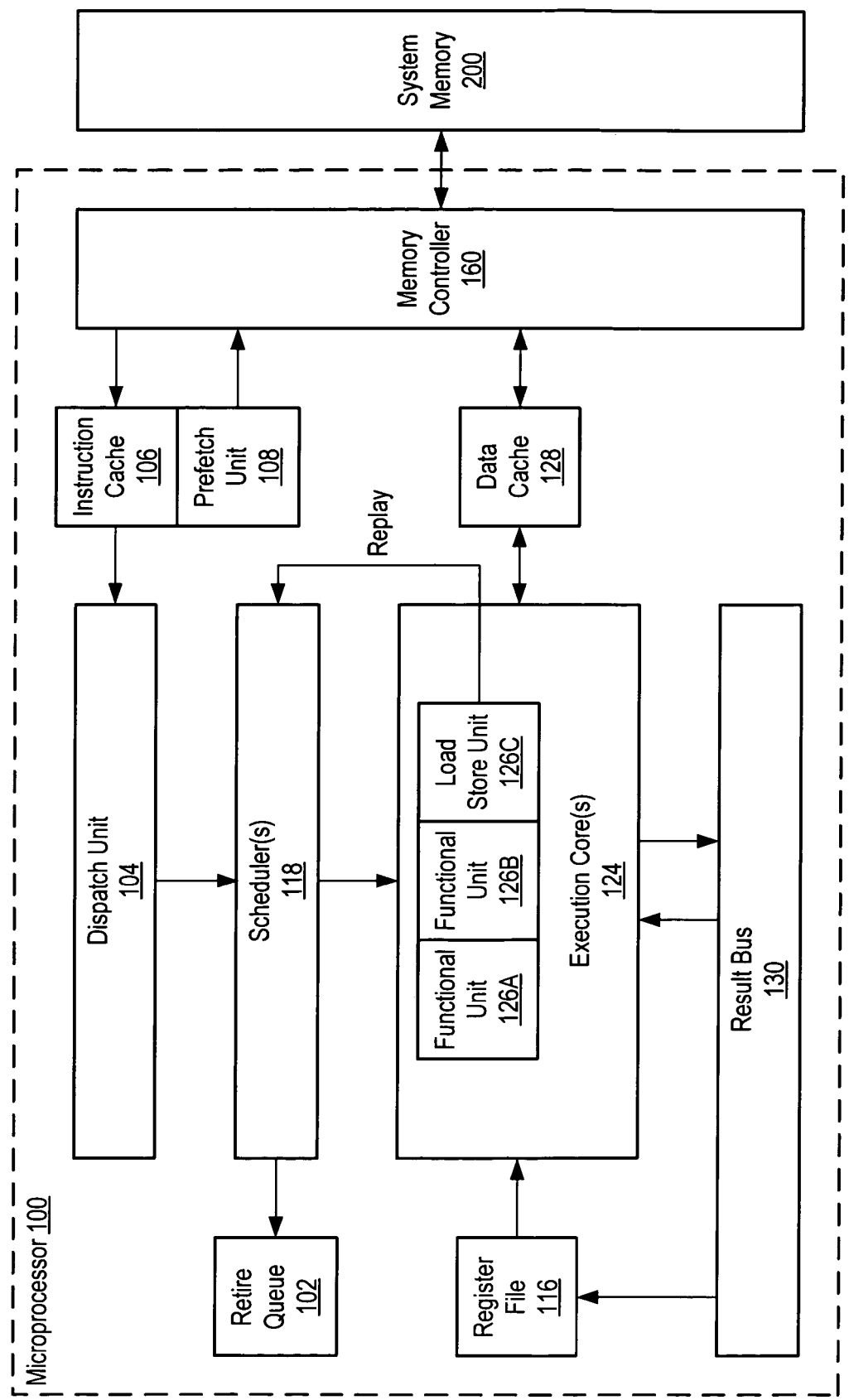
FIG. 1 shows a microprocessor, according to one embodiment.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must). The term "include" and derivations thereof mean "including, but not limited to." The term "connected" means "directly or indirectly connected," and the term "coupled" means "directly or indirectly coupled."

DETAILED DESCRIPTION OF EMBODIMENTS

FIG. 1 is a block diagram of one embodiment of a microprocessor 100. Microprocessor 100 is configured to execute instructions stored in a system memory 200. Many of these instructions operate on data stored in system memory 200. Note that system memory 200 may be physically distributed throughout a computer system and may be accessed by one or more microprocessors 100.

Microprocessor 100 may include an instruction cache 106 and a data cache 128. Microprocessor 100 may include a prefetch unit 108 coupled to the instruction cache 106. A dispatch unit 104 may be configured to receive instructions from instruction cache 106 and to dispatch operations to scheduler(s) 118. One or more schedulers 118 may be coupled to receive dispatched operations from dispatch unit 104 and to issue operations to one or more execution cores 124. Execution core(s) 124 may each include a load/store unit configured to perform accesses to data cache 128. Results generated by execution core(s) 124 may be output to a result bus 130. These results may be used as operand values for subsequently issued instructions and/or stored to register file 116. A retire queue 102 may be coupled to scheduler(s) 118 and dispatch unit 104. The retire queue 102 may be configured to determine when each issued operation may be retired. In one embodiment, the microprocessor 100 may be designed to be compatible with the x86 architecture. Note that microprocessor 100 may also include many other components. For example, microprocessor 100 may include a branch prediction unit (not shown).

Instruction cache 106 may temporarily store instructions prior to their receipt by dispatch unit 104. Instruction code may be provided to instruction cache 106 by prefetching code from the system memory 200 through prefetch unit 108. Instruction cache 106 may be implemented in various configurations (e.g., set-associative, fully-associative, or direct-mapped). In some embodiments, there may be multiple levels of instruction and/or data cache 106 and 128. Some levels may be integrated with the microprocessor 100, as shown, while other levels of cache may be external to the microprocessor.

Prefetch unit 108 may prefetch instruction code from the system memory 200 for storage within instruction cache 106. In one embodiment, prefetch unit 108 may be configured to burst code from the system memory 200 into instruction cache 106. Prefetch unit 108 may employ a variety of specific code prefetching techniques and algorithms.

Dispatch unit 104 may output signals including bit-encoded operations executable by the execution core(s) 124 as well as operand address information, immediate data, and/or displacement data. In some embodiments, dispatch unit 104 may include decoding circuitry (not shown) for decoding certain instructions into operations executable within execution core(s) 124. Simple instructions may correspond to a single operation. In some embodiments, more complex instructions may correspond to multiple operations. If an operation involves the update of a register, a register location within register file 116 may be reserved (e.g., upon decode of that operation) to store speculative register states (in an alternative embodiment, a reorder buffer may be used to store one or more speculative register states for each register). A register map may translate logical register names of source and destination operands to physical register names in order to facilitate register renaming. A register map may track which registers within register file 116 are currently allocated.

The microprocessor 100 of FIG. 1 supports out of order execution. A retire queue 102 may keep track of the original program sequence for register read and write operations, allow for speculative instruction execution and branch misprediction recovery, and facilitate precise exceptions. Retire queue 102 may be implemented in a first-in-first-out configuration in which operations move to the "bottom" of the buffer as they are validated, making room for new entries at the "top" of the queue. Retire queue 102 may retire an operation in response to that operation completing execution and any data or control speculation performed on any operations, up to and including that operation in program order, being verified. Retire queue 102 may commit the speculative state of a physical register to the architectural state of microprocessor 100 when the operation that generated the value in that physical register is retired. In some embodiments, retire queue 102 may be implemented as part of a reorder buffer. Such a reorder buffer may also provide data value storage for speculative register states in order to support register renaming. Note that in other embodiments, retire queue 102 may not provide any data value storage. Instead, as operations are retired, retire queue 102 may deallocate registers in register file 116 that are no longer needed to store speculative register states and provide signals to the register map indicating which registers are currently free. By maintaining speculative register states within register file 116 (or, in alternative embodiments, within a reorder buffer) until the operations that generated those states are validated, the results of speculatively-executed operations along a mispredicted path may be invalidated in the register file 116 if a branch prediction is incorrect.

If a required operand of a particular operation is a register location, register address information may be routed to a register map (or a reorder buffer). For example, in the x86 architecture, there are eight 32-bit logical registers (e.g., EAX, EBX, ECX, EDX, EBP, ESI, EDI and ESP). Physical register file 116 (or a reorder buffer) includes storage for results that change the contents of these logical registers, allowing out of order execution. A physical register in register file 116 may be allocated to store the result of each operation that is determined to modify the contents of one of the logical registers. Therefore, at various points during execution of a particular program, register file 116 (or, in alternative embodiments, a reorder buffer) may have one or more registers that contain the speculatively executed contents of a given logical register.

A register map may assign a physical register to a particular logical register specified as a destination operand for an operation. Dispatch unit 104 may determine that register file 116 has one or more previously allocated physical registers assigned to a logical register specified as a source operand in a given operation. The register map may provide a tag for the physical register most recently assigned to that logical register. This tag may be used to access the operand's data value in the register file 116 or to receive the data value via result forwarding on the result bus 130. If the operand corresponds to a memory location, the operand value may be provided on the result bus (for result forwarding and/or storage in register file 118) through load/store unit 222. Operand data values may be provided to execution core(s) 124 when the operation is issued by one of the scheduler(s)

118. Note that in alternative embodiments, operand values may be provided to a corresponding scheduler 118 when an operation is dispatched (instead of being provided to a corresponding execution core 124 when the operation is issued).

The bit-encoded operations and immediate data provided at the outputs of dispatch unit 104 may be routed to one or more schedulers 118. Note that as used herein, a scheduler is a device that detects when operations are ready for execution and issues ready operations to one or more functional units. For example, a reservation station is a scheduler. Operations in a scheduler or group of schedulers may also be referred to as operations in an instruction or operation window or scheduling window. Each scheduler 118 may be capable of holding operation information (e.g., bit encoded execution bits as well as operand values, operand tags, and/or immediate data) for several pending operations awaiting issue to an execution core 124. In some embodiments, each scheduler 118 may not provide operand value storage. Instead, each scheduler may monitor issued operations and results available in register file 116 in order to determine when operand values will be available to be read by functional units 126 (from register file 116 or result bus 130). In some embodiments, each scheduler 118 may be associated with a dedicated functional unit 126. In other embodiments, a single scheduler 118 may issue operations to more than one of the functional units 126.

Schedulers 118 may be provided to temporarily store operation information to be executed by the execution core(s) 124. As stated previously, each scheduler 118 may store operation information for pending operations. Additionally, each scheduler may store operation information for operations that have already been executed but may still reissue. Operations are issued to execution core(s) 124 for execution in response to the values of any required operand(s) being made available in time for execution. Accordingly, the order in which operations are executed may not be the same as the order of the original program instruction sequence. Operations that involve data speculation may remain in scheduler(s) 118 until they become non-speculative so that they may be reissued if the data speculation is incorrect. As illustrated in FIG. 1, a load store unit 126C may provide a replay indication identifying one or more operations to be reissued to scheduler 118 (e.g., such a replay indication may include the tag of each operation to be replayed). Scheduler 118 may responsively reissue operations identified by such a replay indication.

In one embodiment, each of the execution core(s) 124 may include several functional units 126 (e.g., functional units 126A–126C, as shown in FIG. 1). Some functional units, e.g., 126A, may be configured to perform integer arithmetic operations of addition and subtraction, as well as shifts, rotates, logical operations, and branch operations. Other functional units, e.g., 126B, may be configured to accommodate floating point operations. One or more of the functional units may be configured to perform address generation for load and store memory operations to be performed by a functional unit, e.g., 126C, that performs load and store operations to access data stored in data cache 128 and/or system memory. In one embodiment, such a functional unit 126C may be configured with a load store buffer with several storage locations for data and address information for pending loads and/or stores.

One or more functional units 126 may also provide information regarding the execution of conditional branch instructions to a branch prediction unit so that if a branch was mispredicted, the branch prediction unit may flush instructions subsequent to the mispredicted branch that have entered the instruction processing pipeline and redirect prefetch unit 106. The redirected prefetch unit 106 may then begin fetching the correct set of instructions from instruction cache 106 or system memory 200. In such situations, the results of instructions in the original program sequence that occurred after the mispredicted branch instruction may be discarded, including those which were speculatively executed and temporarily stored in register file 116.

Results produced by functional units 126 within execution core(s) 124 may be output on the result bus 130 to the register file 116 if a register value is being updated. If the contents of a memory location are being changed, the results produced within execution core(s) 124 may be provided to the load/store unit 126C.

Data cache 128 is a cache memory provided to temporarily store data being transferred between execution core(s) 124 and the system memory 200. Like the instruction cache 106 described above, the data cache 128 may be implemented in a variety of specific memory configurations, including a set associative configuration. Additionally, data cache 106 and instruction cache 128 may be implemented in a unified cache in some embodiments.

In some embodiments, a microprocessor 100 may include an integrated memory controller 160, allowing the microprocessor to interface directly to system memory 200. In other embodiments, memory controller 160 may be included in a bus bridge that indirectly couples microprocessor 100 to system memory 200.

Data Speculation

As described herein, a data value is speculative if there is a possibility that the data value may found to be incorrect and consequentially recomputed. A speculative data value is one that cannot be identified with certainty as being correct or incorrect. A data value may be recomputed if that data value is the result of an operation for which some data speculation has been performed or if the data value depends on another speculative data value (e.g., if the data value is generated as the result of an operation having one or more speculative operands). A non-speculative value is a value that does not depend on any data speculation (such a value may still be subject to control speculation, however).

Various mechanisms within a microprocessor 100 may perform data speculation. For example, dispatch unit 104, memory controller 160, and/or one or more functional units 126 may each perform data speculation for a particular operation. Dispatch unit 104 may detect that a result of one operation may be used as a speculative operand for another operation. For example, dispatch unit may predict that a load operation will access data stored to data cache 128 by a prior store operation. The dispatch unit 104 may responsively identify the data value stored in the register used as the source of the store operation as the speculative result of the load operation. This type of data speculation is referred to herein as dependency prediction. Dependency prediction may be extended in the dispatch unit 104 by linking the source of the store operation as a speculative operand source for operations specifying the result of the load operation as an operand. Another type of dependency prediction may be performed in load store unit 126C by allowing loads to bypass stores with uncomputed addresses, i.e., by predicting that younger loads are not dependent on earlier stores.

In a multiprocessor system, memory controller 160 may perform coherency checks to maintain cache coherency. Memory controller 160 may speculatively return a copy of a cache line from system memory 200 before coherency checks with other microprocessors' caches are complete. If the coherency checks subsequently determine that the correct copy of the cache line to retrieve is currently stored in another processor's cache, the copy of the cache line speculatively retrieved from system memory 200 may be invalidated. Accordingly, any load operation results generated from accessing that cache line will be speculative until the coherency checks finish. This type of speculation is referred to herein as memory prediction.

Dispatch unit 104 may perform data speculation by predicting the result of an operation. For example, some operations may tend to generate the same result, and thus each time one of those operations is handled, the result may be speculatively generated by dispatch unit 104 prior to actual execution of the operation by a functional unit 126. This type of data speculation is referred to herein as data prediction. Note that data prediction may also be performed in other portions of the microprocessor (e.g., in a load store unit 126C).

A load store unit 126C may speculatively generate the address and, based on the speculative address, result of a load instruction whose address has not yet been computed based on a pattern of earlier-handled loads. For example, if the previous N load operations have targeted addresses A1-AN that are spaced by a constant offset C from each other (e.g., A1, A2=A1+C, . . . , AN=A(N−1)+C), the load store unit 126C may speculatively return the data at the most recently accessed address AN plus the constant offset C as the result of the load operation. This type of data speculation is referred to herein as address prediction. Note that other forms of address prediction may be employed in many embodiments.

Multiple different types of data speculation may be performed to produce some speculative results. For example, the speculative result of an integer operation may be generated using data prediction. This speculative result may then be stored by a store operation. A load operation may be predicted to be dependent on this store through dependency prediction, and thus the speculative result of the load operation is the speculative result of the integer operation.

Operations that depend on the result of operations on which data speculation has been performed may also generate speculative results. For example, if address prediction is used to generate the speculative result of a load operation, any dependent operations that execute using the load's speculative result as an operand may produce speculative results, which may in turn by used as operands by other dependent operations. Accordingly, if the underlying speculation in the load operation is determined to be incorrect, the dependent operations' results may also be incorrect, and thus the entire dependency chain of operations dependent on that load may need to be re-executed in order to produce correct results. On the other hand, if the underlying speculation is found to be correct, the dependent operations' results may be correct (assuming those results are not based on any other speculative values).

Many operations for which data speculation has been performed may be verified when those operations are executed by a functional unit. For example, the data prediction used to speculatively generate the result an operation may be verified by the functional unit 126 that executes that operation by comparing the actual result of the operation with the speculative result. Such operations may not need to be re-executed if the data speculation is incorrect, since the correct result is already available. Other operations may be verified without being completely executed. For example, if a load with an uncomputed address forwarded its result from an earlier store (e.g., due to dependency or address prediction), the speculative result of the load may be verified when the load address is calculated. If the data speculation is incorrect, such an operation may need to be re-executed (at least partially) in order to generate the correct result.

Since operations for which data speculation has been performed and their dependent operations may need to be re-executed, retire queue 102 may be configured to only retire operations for which any underlying data speculation has resolved.

Load Store Unit with Replay Mechanism

In a microprocessor that supports data-speculative execution, one or more operations may need to be re-executed due to incorrect data speculation. Microprocessor 100 may include various replay mechanisms to allow operations to be re-executed. For example, scheduler 118 may be configured to reissue an operation to a functional unit 126C in response to an indication that one of that operation's data-speculative operands is incorrect. Similarly, a load store unit 126C may also include a replay mechanism that detects which outstanding operations within the load store unit need to replay in response to an operation's data speculation resolved incorrectly. The load store unit 126C may signal the scheduler as to which outstanding operations should replay, causing the scheduler to reissue those operations to the load store unit 126C at a later time.

Figure 2:
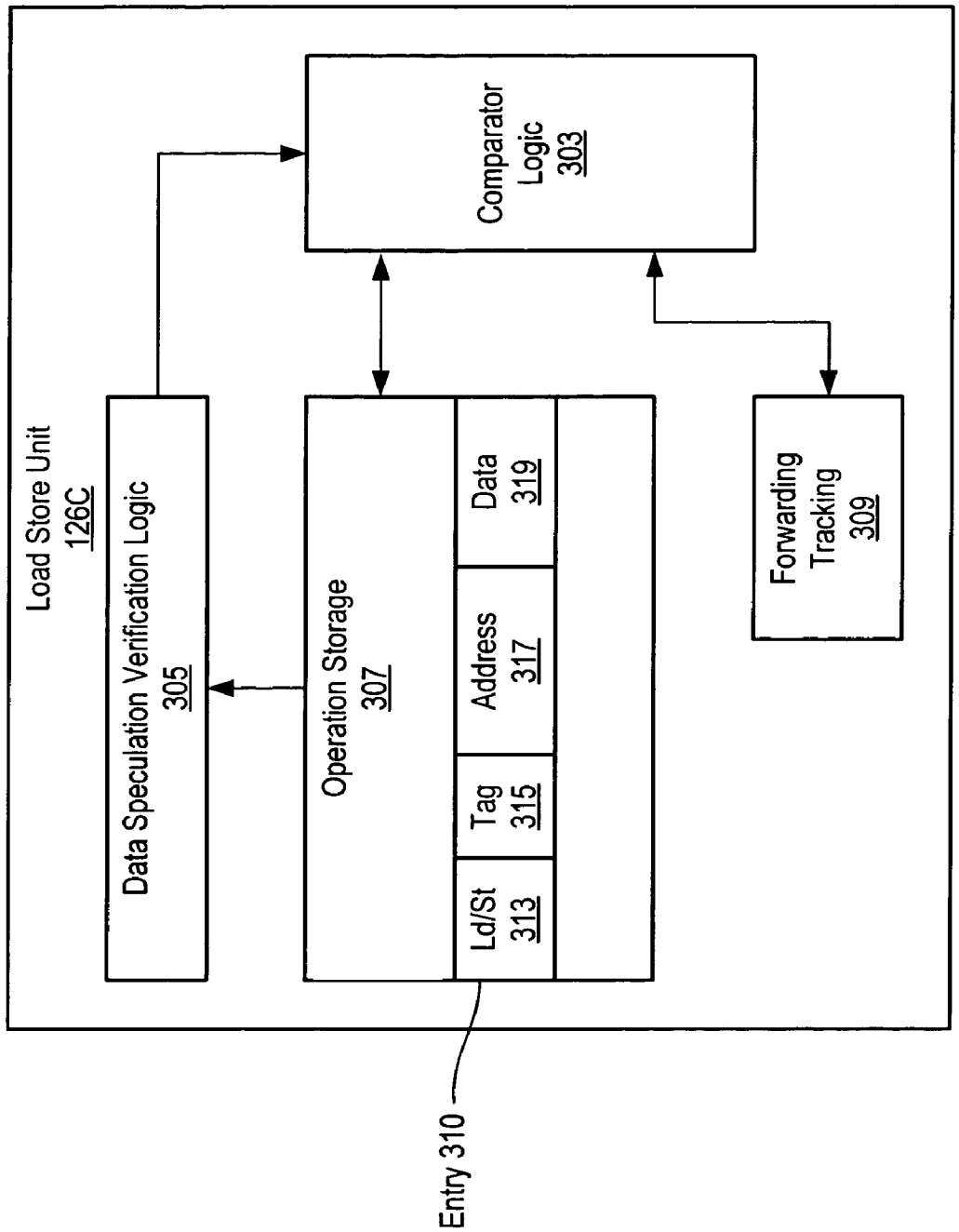
FIG. 2 shows a block diagram of a load store unit, according to one embodiment.

FIG. 2 illustrates one embodiment of a load store unit 126C that is configured to replay operations due to incorrect data speculation being detected by the load store unit 126C. Data speculation verification logic 305 may be configured to verify each type of data speculation performed by the load store unit 126C. For example, if the load store unit performs both address prediction (e.g., by predicting the address of a load operation) and dependency prediction (e.g., by allowing loads to bypass earlier stores with uncomputed addresses), the load store unit may be configured to verify both address and dependency prediction. Data speculation verification logic 305 may also (or alternatively) be configured to verify data speculation performed by other portions of microprocessor 100. For example, if dispatch unit 104 is configured to perform dependency prediction (e.g., by speculatively linking a load result to the source of an earlier store), data speculation verification logic 305 may be configured to verify that dependency prediction.

Load store unit 126C also includes operation storage 307 for operations that have been issued to the load store unit (e.g., by scheduler 118) but that have not yet completed execution. An operation issued to the load store unit on which data speculation has been performed may not be retired until that operation has been verified by data speculation verification logic 305. Operation storage 307 may track all outstanding operations within the load store unit 126C. Operation storage 307 may include an entry 310 for each outstanding load and store.

An entry 310 may also include information 313 indicating whether the entry is allocated to a load or store (or, in some embodiments, an entry may indicate that it includes both a load and a store if it corresponds to an operation that operates on a value loaded from a memory address and stores the result to a memory address). Additionally, an entry 310 may include a tag 315 (e.g., identifying the operation and its result within the microprocessor 100), an address 317, and/or data 319. The data field 319 of each entry may, in some embodiments, include storage for both speculative and non-speculative data. Similarly, the address field 317 may include storage for more than one value of an operation's address (e.g., a speculative address generated by address prediction and a new address value generated by executing an operation) in some embodiments. In some embodiments, entries may include additional fields to identify operations and/or operands as data-speculative. An entry 310 may be allocated in response to scheduler 118 issuing an operation to the load store unit 126C and deallocated in response to load store unit 126C completing execution of the operation.

Data speculation verification logic 305 may verify certain types of data speculation (e.g., data prediction and/or some types of dependency prediction) by comparing the speculative result of an operation with the operation's actual result. For example, the speculative result of a load operation may be stored in that load's entry 310 within operation storage 307. When the actual result of that load operation is received from data cache 128, the data speculation verification logic may compare the actual result to the speculative result stored in operation storage 307. Data speculation verification logic 305 may verify other types of data speculation (e.g., some types of dependency prediction) by comparing the address of an operation to the addresses of one or more earlier operations. Data speculation verification logic 305 may verify other types of data speculation (e.g., address prediction) by comparing the speculative address of an operation to a new value of that address in response to the new value being broadcast on the result bus 130. If the speculative address does not match the new value of the address, the data speculation verification logic 305 may determine that the data speculation performed on the address is incorrect.

In response to detecting that the data speculation for a particular operation is incorrect, data speculation verification logic 305 may cause one or more operations to be replayed. An operation may be replayed by providing a replay signal identifying that operation to the scheduler 118. In response to such a signal, the scheduler 118 may mark the operation for replay (e.g., by modifying state information associated with that operation to indicate that the operation should be replayed). In one embodiment, data speculation verification logic 305 may cause an operation to be replayed by providing that operation's tag to the scheduler 118 along with a flag indicating that the operation should be replayed.

If the incorrectly speculated operation needs to be re-executed (e.g., due to incorrect dependency prediction or incorrect address prediction), data speculation verification logic 305 may cause that operation to be replayed. If the correct result of the incorrectly speculated result is already available (e.g., if the incorrect result is due to an incorrect data or dependency prediction), data speculation verification unit may cause load store unit 126C to broadcast the correct result of the incorrectly speculated operation to the other components of the microprocessor so that any dependent operations within other portions of the microprocessor may re-execute using the correct value. Data speculation verification logic 305 may not cause such an operation to be replayed in some embodiments. Note that the load store unit 126C may complete execution of an outstanding operation, even if the load store unit 126C also causes that operation to be replayed.

In addition to replaying the incorrectly speculated operation, if needed, data speculation verification logic 305 may also cause other operations currently outstanding with the load store unit to be replayed. For example, some load operations may forward data from a store operation based on the store operation's speculative address. If the store operation's speculative address is determined to be incorrect (e.g., if execution of an operation that generates the store operation's address produces a new address value that does not equal the speculative address), any load operation's that forwarded data based on the store's speculative address may be replayed. Similarly, and load operations whose addresses match the new address for the store operation may also be replayed so that those operations can now forward data from the store. Similarly, data speculation verification logic 305 may be configured to detect when the operand for a store operation is rebroadcast on the result bus and to responsively cause the replay of any dependent load operations that forwarded the previous value of the store operation's operand.

In one embodiment, the data speculation verification logic 305 may replay dependent operations by causing all outstanding operations within the load store unit that are younger than the incorrectly speculated operation to replay. In some embodiments, comparator logic 303 may identify the younger operations within operation storage 307 for replay. Comparator logic 303 may include any of various means for comparing values and/or detecting matching values (e.g., comparators, content-addressable memory, etc.).

In other embodiments, data speculation verification logic 305 may employ comparator logic 303 to selectively replay certain younger operations in response to the detection of incorrect data speculation for a particular operation. For example, in one embodiment, in response to incorrect data speculation for a store operation's address being detected, comparator logic 303 may compare the speculative value and new value of the store's address to the addresses of each younger operation within operation storage 307. If any of the younger operations' addresses match either of the store's addresses, the matching younger operations may be caused to re-execute by providing the scheduler with an indication of the need to replay those operations.

In some embodiments, load store unit 126C may implement store-to-load-forwarding by comparing the addresses of outstanding loads to the addresses of older stores. If a load's address matches the address of an older store, the load store unit 126C may output the data stored by the older store operation as the result of the load operation. Each time a load operation forwards data from a store operation, the load store unit 126C may store a tag identifying the store operation in a forwarding tracking buffer 309 entry associated with the load operation that forwarded. In some of these embodiments, comparator logic 303 may use the information provided by forwarding tracking buffer 309 to identify operations for re-execution in response to data speculation verification logic 305 detecting incorrect data speculation for an operation. For example, if address prediction for a store operation is determined to be incorrect, comparator logic 303 may be configured to compare the new value of the address for the store operation to the addresses of each younger load operation in operation storage 307. Any matching operations should have forwarded data from the incorrectly speculated store but did not due to the incorrectly speculated store address. Accordingly, the load store unit 126C may cause these matching operations to be re-executed. Additionally, the tag of the incorrectly speculated store operation may be compared to the tags stored in forwarding tracking buffer 309 for younger loads. If the tag of the incorrectly speculated store operation matches a tag stored for a younger load, indicating that the younger load incorrectly forwarded data based on the incorrectly speculated address of the store, that load store unit 126C may cause that younger load to be re-executed.

Figure 3A:
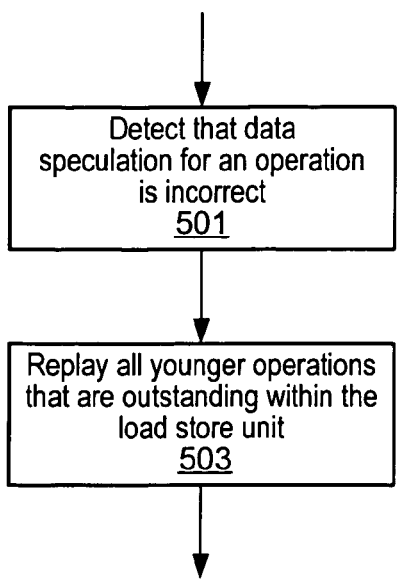
FIG. 3A is a flowchart of a method of replaying operations within a load store unit, according to one embodiment.

FIG. 3A illustrates one embodiment of a method of replaying outstanding operations within a load store unit in response to detection of incorrect data speculation. At 501, an indication that the data speculation for an operation is incorrect is detected. For example, a load store unit may receive a new value of the address for the operation from an address generation unit (which may be part of the load store unit in some embodiments). The new address value may differ from a speculative address value used by the load store unit to generate a speculative result of that operation or of another operation, indicating that the data speculation performed on the address is incorrect. In another example, a load store unit may detect an incorrect dependency prediction by comparing the speculative result of a load (e.g., generated by predicting that the load result would equal the source of an earlier store) to the actual result of the load obtained by accessing the data cache.

In the embodiment of FIG. 3A, the load store unit may cause all of the younger outstanding operations within the load store unit to be re-executed in response to detecting that the data speculation for an operation is incorrect, as indicated at 503. The load store unit may cause the younger operations to be re-executed by providing the tag of each operation to be replayed to a scheduler. In response to the tags provided by the load store unit, the scheduler may update the state of the operation (e.g., from "issued" to "non-issued" or "needs to be reissued") within the scheduler. Such a replay mechanism allows the younger operations to be replayed without being flushed from the processing pipeline of the microprocessor and refetched from instruction cache 106.

Figure 3B:
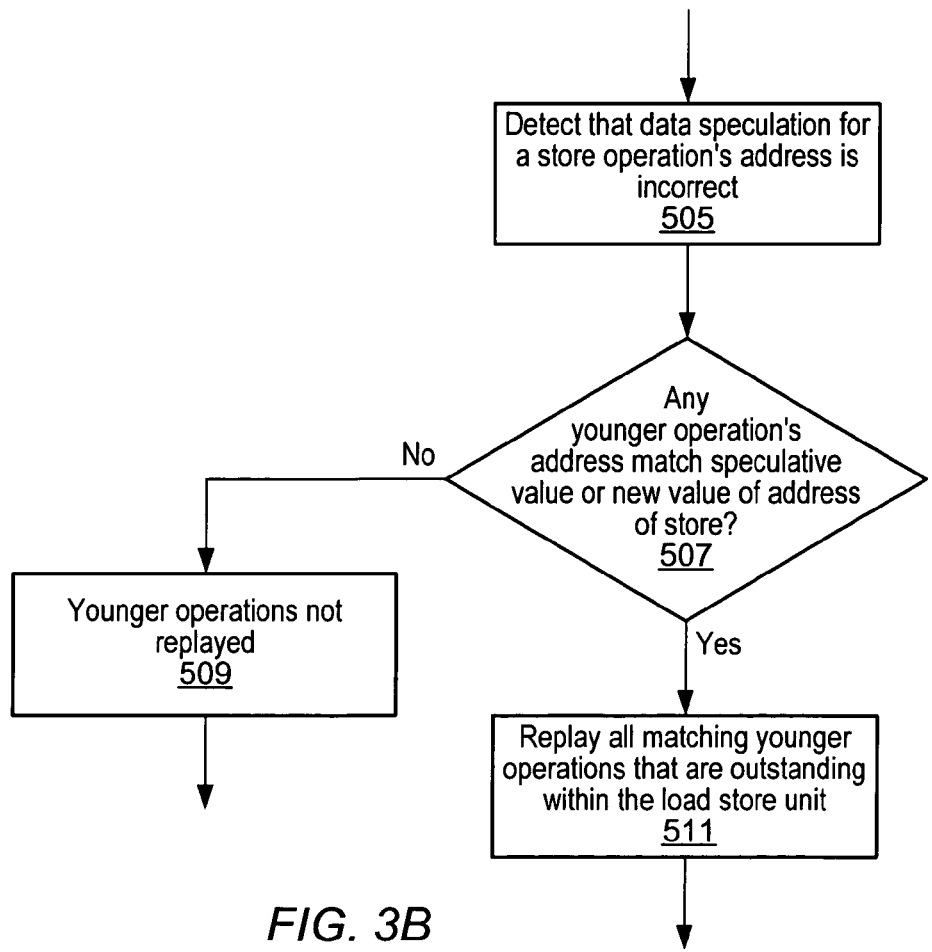
FIG. 3B is a flowchart of a method of replaying operations within a load store unit, according to another embodiment.

FIG. 3B illustrates another embodiment of a method of re-executing outstanding operations within a load store unit. At 505, an indication that the data speculation for a store's address is incorrect is detected. If any younger outstanding loads or stores have addresses matching the speculative value or the new value of the address of the incorrectly speculated store, as determined at 507, the matching operations may be re-executed. If none of the younger operations' addresses match either the speculative value or the new value of the address of the store operation, the younger operations' may not be replayed, as indicated at 509.

Figure 3C:
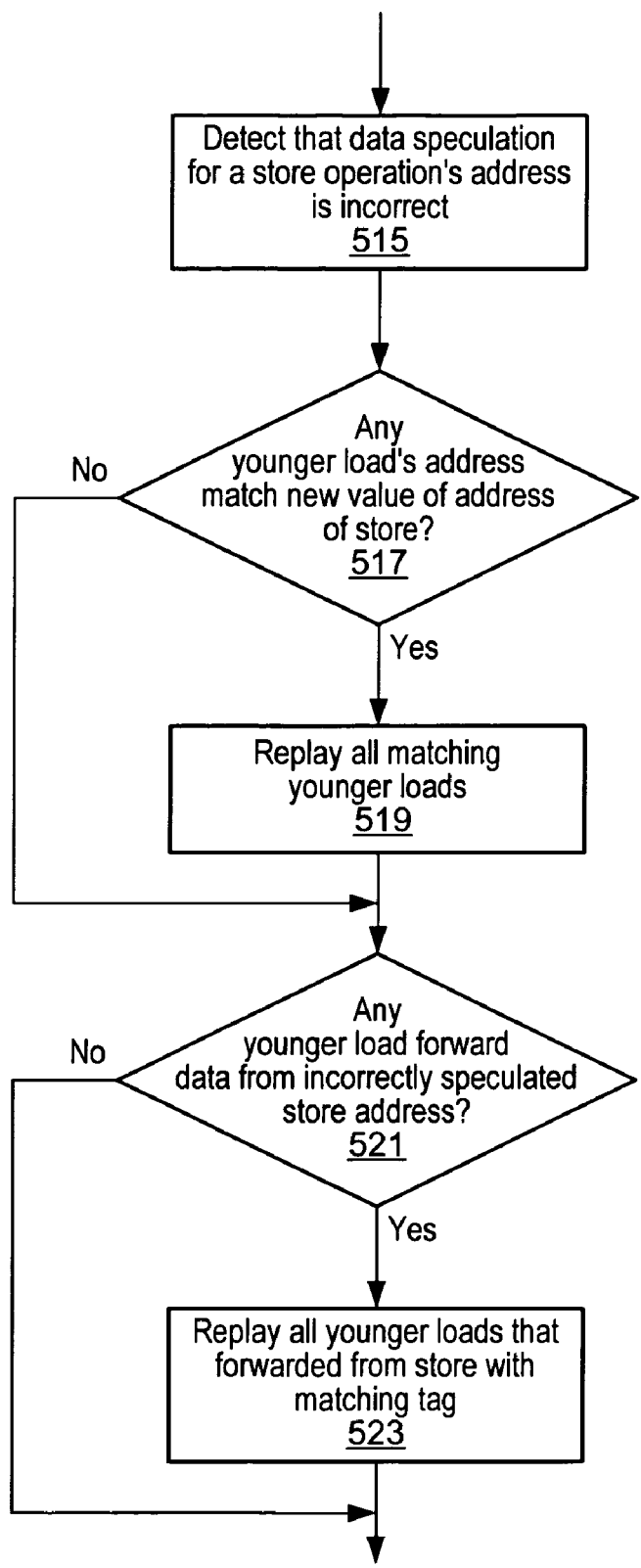
FIG. 3C is a flowchart of a method of replaying operations within a load store unit, according to yet another embodiment.

FIG. 3C illustrates yet another embodiment of a method of re-executing outstanding operations within a load store unit. At 515, an indication that the data speculation for a store operation's address is incorrect is detected. If any younger load's addresses match the new value of the address of the store operation, the matching younger loads may be replayed. If any younger loads forwarded data from the incorrectly speculated store (e.g., as determined by comparing the tags of store operations from which the younger loads forwarded data to the tag of the incorrectly speculated store), as determined at 521, the matching younger loads may be replayed.

Note that other embodiments may operate differently than those of FIGS. 3A–3C. For example, in an embodiment similar to that of FIG. 3B, only younger load operations whose addresses match the speculative value or the new value of the address of the incorrectly speculated store may be re-executed. Similarly, in an embodiment similar to that of FIG. 3C, younger loads and stores whose addresses match the new value of the address of the incorrectly speculated store may be re-executed. Many other variations are possible.

Exemplary Computer Systems

Figure 4:
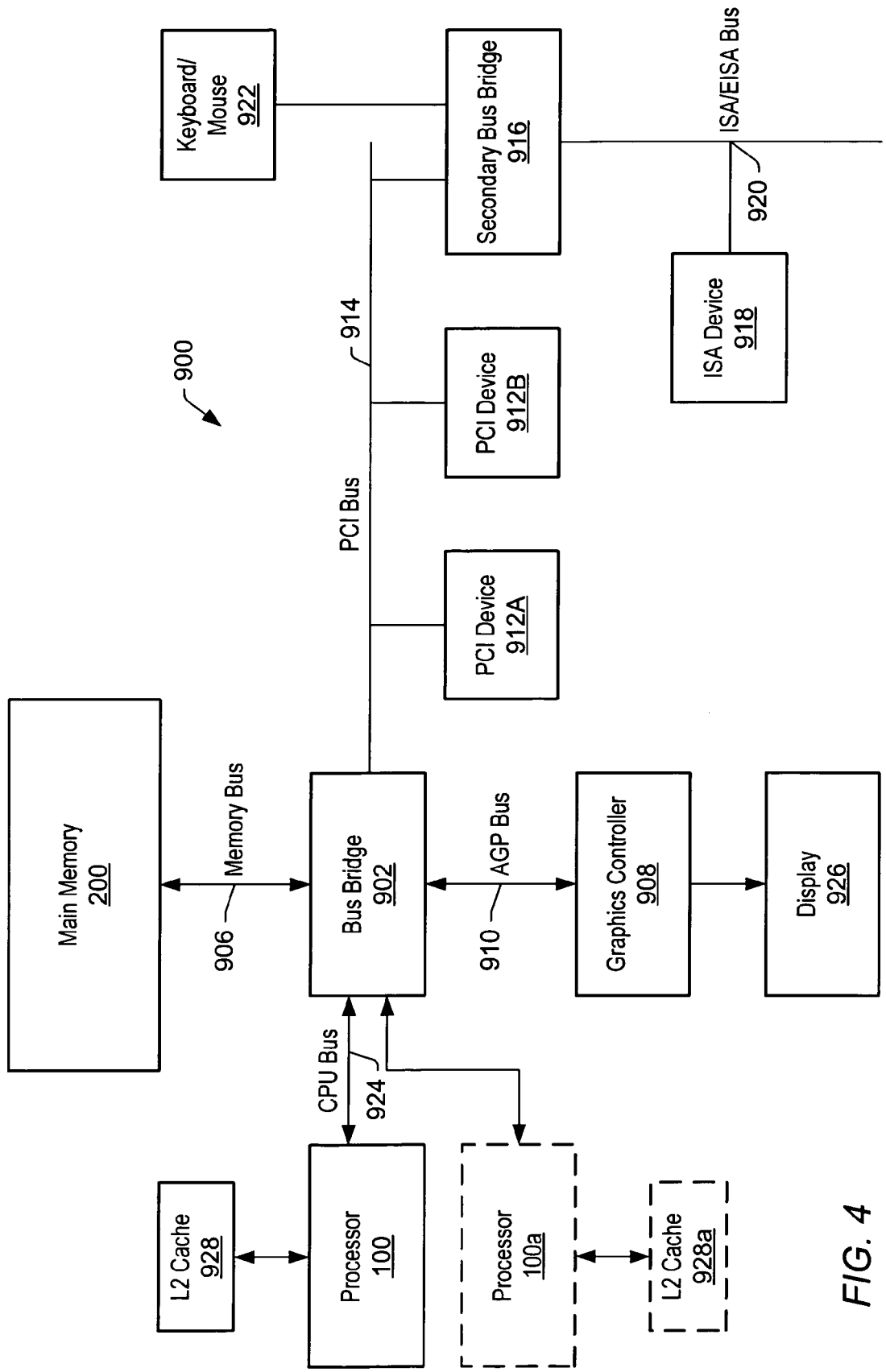
FIG. 4 shows an exemplary computer system, according to one embodiment.

FIG. 4 shows a block diagram of one embodiment of a computer system 900 that includes a processor 100 coupled to a variety of system components through a bus bridge 902. Processor 100 may include an embodiment of a load store unit as described above. Other embodiments of a computer system are possible and contemplated. In the depicted system, a main memory 200 is coupled to bus bridge 902 through a memory bus 906, and a graphics controller 908 is coupled to bus bridge 902 through an AGP bus 910. Several PCI devices 912A–912B are coupled to bus bridge 902 through a PCI bus 914. A secondary bus bridge 916 may also be provided to accommodate an electrical interface to one or more EISA or ISA devices 918 through an EISA/ISA bus 920. In this example, processor 10 is coupled to bus bridge 902 through a CPU bus 924 and to an optional L2 cache 928. In some embodiments, the processor 100 may include an integrated L1 cache (not shown).

Bus bridge 902 provides an interface between processor 100, main memory 200, graphics controller 908, and devices attached to PCI bus 914. When an operation is received from one of the devices connected to bus bridge 902, bus bridge 902 identifies the target of the operation (e.g., a particular device or, in the case of PCI bus 914, that the target is on PCI bus 914). Bus bridge 902 routes the operation to the targeted device. Bus bridge 902 generally translates an operation from the protocol used by the source device or bus to the protocol used by the target device or bus.

In addition to providing an interface to an ISA/EISA bus for PCI bus 914, secondary bus bridge 916 may incorporate additional functionality. An input/output controller (not shown), either external from or integrated with secondary bus bridge 916, may also be included within computer system 900 to provide operational support for a keyboard and mouse 922 and for various serial and parallel ports. An external cache unit (not shown) may also be coupled to CPU bus 924 between processor 100 and bus bridge 902 in other embodiments. Alternatively, the external cache may be coupled to bus bridge 902 and cache control logic for the external cache may be integrated into bus bridge 902. L2 cache 928 is shown in a backside configuration to processor 100. It is noted that L2 cache 928 may be separate from processor 100, integrated into a cartridge (e.g., slot 1 or slot A) with processor 100, or even integrated onto a semiconductor substrate with processor 100.

Main memory 200 is a memory in which application programs are stored and from which processor 100 primarily executes. A suitable main memory 200 may include DRAM (Dynamic Random Access Memory). For example, a plurality of banks of SDRAM (Synchronous DRAM) or Rambus DRAM (RDRAM) may be suitable.

PCI devices 912A–912B are illustrative of a variety of peripheral devices such as network interface cards, video accelerators, audio cards, hard or floppy disk drives or drive controllers, SCSI (Small Computer Systems Interface) adapters and telephony cards. Similarly, ISA device 918 is illustrative of various types of peripheral devices, such as a modem, a sound card, and a variety of data acquisition cards such as GPIB or field bus interface cards.

Graphics controller 908 is provided to control the rendering of text and images on a display 926. Graphics controller 908 may embody a typical graphics accelerator generally known in the art to render three-dimensional data structures that can be effectively shifted into and from main memory 200. Graphics controller 908 may therefore be a master of AGP bus 910 in that it can request and receive access to a target interface within bus bridge 902 to thereby obtain access to main memory 200. A dedicated graphics bus accommodates rapid retrieval of data from main memory 200. For certain operations, graphics controller 908 may further be configured to generate PCI protocol transactions on AGP bus 910. The AGP interface of bus bridge 902 may thus include functionality to support both AGP protocol transactions as well as PCI protocol target and initiator transactions. Display 926 is any electronic display upon which an image or text can be presented. A suitable display 926 includes a cathode ray tube ("CRT"), a liquid crystal display ("LCD"), etc.

It is noted that, while the AGP, PCI, and ISA or EISA buses have been used as examples in the above description, any bus architectures may be substituted as desired. It is further noted that computer system 900 may be a multiprocessing computer system including additional processors (e.g., processor 100a shown as an optional component of computer system 900). Processor 10a may be similar to processor 100. More particularly, processor 100a may be an identical copy of processor 100. Processor 100a may be connected to bus bridge 902 via an independent bus (as shown in FIG. 4) or may share CPU bus 924 with processor 100. Furthermore, processor 100a may be coupled to an optional L2 cache 928a similar to L2 cache 928.

Figure 5:
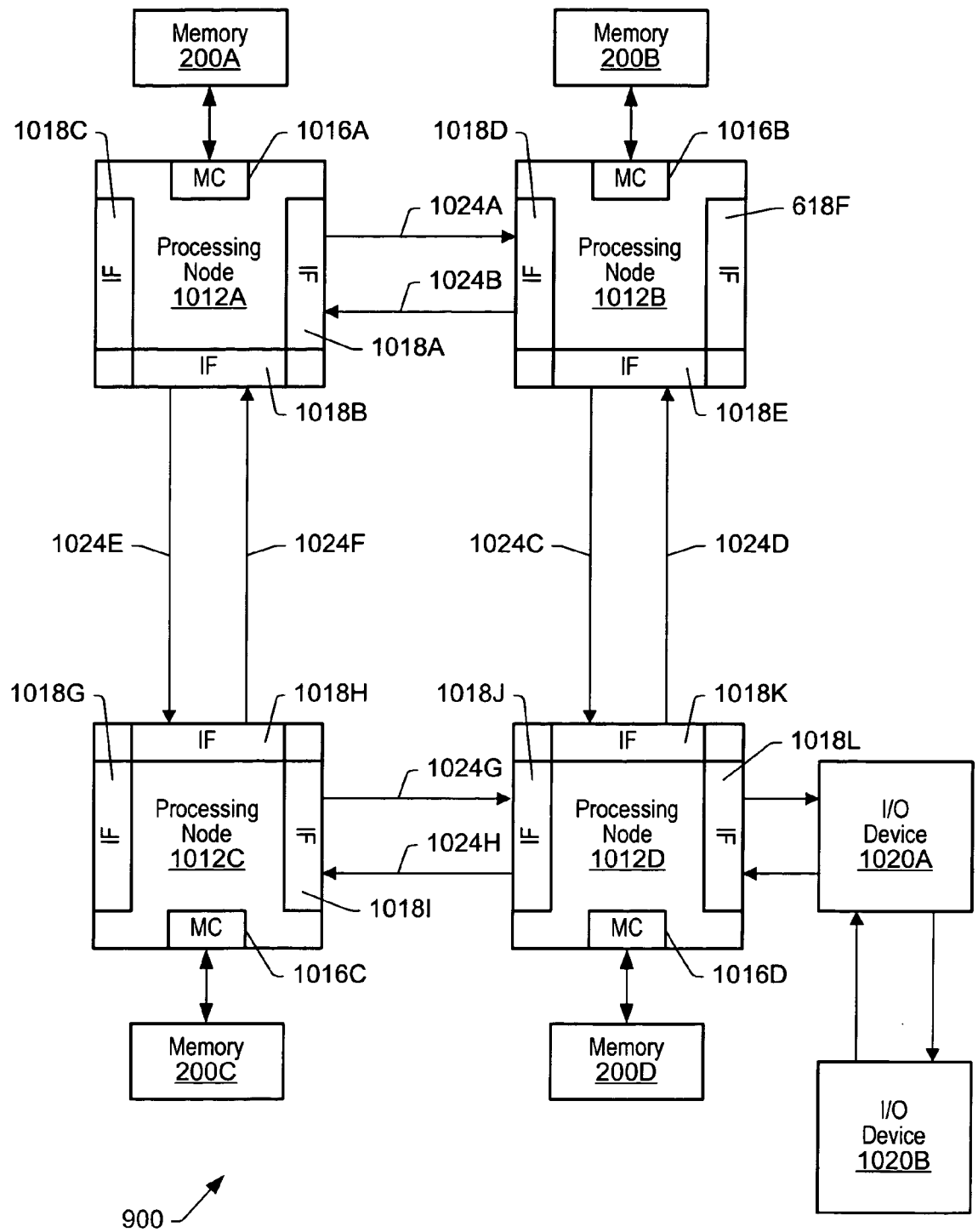
FIG. 5 shows another exemplary computer system, according to another embodiment.

Turning now to FIG. 5, another embodiment of a computer system 900 that may include a processor 100 having an embodiment of a load store unit as described above is shown. Other embodiments are possible and contemplated. In the embodiment of FIG. 5, computer system 900 includes several processing nodes 1012A, 1012B, 1012C, and 1012D. Each processing node is coupled to a respective memory 200A–200D via a memory controller 1016A–1016D included within each respective processing node 1012A–1012D. Additionally, processing nodes 1012A–1012D include interface logic used to communicate between the processing nodes 1012A–1012D. For example, processing node 1012A includes interface logic 1018A for communicating with processing node 1012B, interface logic 1018B for communicating with processing node 1012C, and a third interface logic 1018C for communicating with yet another processing node (not shown). Similarly, processing node 1012B includes interface logic 1018D, 1018E, and 1018F; processing node 1012C includes interface logic 1018G, 1018H, and 10181; and processing node 1012D includes interface logic 1018J, 1018K, and 1018L. Processing node 1012D is coupled to communicate with a plurality of input/output devices (e.g., devices 1020A–1020B in a daisy chain configuration) via interface logic 1018L. Other processing nodes may communicate with other I/O devices in a similar fashion.

Processing nodes 1012A–1012D implement a packet-based link for inter-processing node communication. In the present embodiment, the link is implemented as sets of unidirectional lines (e.g., lines 1024A are used to transmit packets from processing node 1012A to processing node 1012B and lines 1024B are used to transmit packets from processing node 1012B to processing node 1012A). Other sets of lines 1024C–1024H are used to transmit packets between other processing nodes as illustrated in FIG. 5. Generally, each set of lines 1024 may include one or more data lines, one or more clock lines corresponding to the data lines, and one or more control lines indicating the type of packet being conveyed. The link may be operated in a cache coherent fashion for communication between processing nodes or in a non-coherent fashion for communication between a processing node and an I/O device (or a bus bridge to an I/O bus of conventional construction such as the PCI bus or ISA bus). Furthermore, the link may be operated in a non-coherent fashion using a daisy-chain structure between I/O devices as shown. It is noted that a packet to be transmitted from one processing node to another may pass through one or more intermediate nodes. For example, a packet transmitted by processing node 1012A to processing node 1012D may pass through either processing node 1012B or processing node 1012C as shown in FIG. 5. Any suitable routing algorithm may be used. Other embodiments of computer system 900 may include more or fewer processing nodes then the embodiment shown in FIG. 5.

Generally, the packets may be transmitted as one or more bit times on the lines 1024 between nodes. A bit time may be the rising or falling edge of the clock signal on the corresponding clock lines. The packets may include command packets for initiating transactions, probe packets for maintaining cache coherency, and response packets from responding to probes and commands.

Processing nodes 1012A–1012D, in addition to a memory controller and interface logic, may include one or more processors. Broadly speaking, a processing node comprises at least one processor and may optionally include a memory controller for communicating with a memory and other logic as desired. More particularly, each processing node 1012A–1012D may include one or more copies of processor 100. External interface unit may include the interface logic 1018 within the node, as well as the memory controller 1016.

Memories 200A–200D may comprise any suitable memory devices. For example, a memory 200A–200D may comprise one or more RAMBUS DRAMs (RDRAMs), synchronous DRAMs (SDRAMs), static RAM, etc. The address space of computer system 900 is divided among memories 200A–200D. Each processing node 1012A–1012D may include a memory map used to determine which addresses are mapped to which memories 200A–200D, and hence to which processing node 1012A–1012D a memory request for a particular address should be routed. In one embodiment, the coherency point for an address within computer system 900 is the memory controller 1016A–1016D coupled to the memory storing bytes corresponding to the address. In other words, the memory controller 1016A–1016D is responsible for ensuring that each memory access to the corresponding memory 200A–200D occurs in a cache coherent fashion. Memory controllers 1016A–1016D may comprise control circuitry for interfacing to memories 200A–200D. Additionally, memory controllers 1016A–1016D may include request queues for queuing memory requests.

Interface logic 1018A–1018L may comprise a variety of buffers for receiving packets from the link and for buffering packets to be transmitted upon the link. Computer system 900 may employ any suitable flow control mechanism for transmitting packets. For example, in one embodiment, each interface logic 1018 stores a count of the number of each type of buffer within the receiver at the other end of the link to which that interface logic is connected. The interface logic does not transmit a packet unless the receiving interface logic has a free buffer to store the packet. As a receiving buffer is freed by routing a packet onward, the receiving interface logic transmits a message to the sending interface logic to indicate that the buffer has been freed. Such a mechanism may be referred to as a "coupon-based" system.

I/O devices 1020A–1020B may be any suitable I/O devices. For example, I/O devices 1020A–1020B may include devices for communicate with another computer system to which the devices may be coupled (e.g., network interface cards or modems). Furthermore, I/O devices 1020A–1020B may include video accelerators, audio cards, hard or floppy disk drives or drive controllers, SCSI (Small Computer Systems Interface) adapters and telephony cards, sound cards, and a variety of data acquisition cards such as GPIB or field bus interface cards. It is noted that the term "I/O device" and the term "peripheral device" are intended to be synonymous herein.

As used herein, the term "clock cycle" refers to an interval of time in which the various stages of the instruction processing pipelines complete their tasks. Instructions and computed values are captured by memory elements (such as registers or arrays) according to a clock signal defining the clock cycle. For example, a memory element may capture a value according to the rising or falling edge of the clock signal.

The above discussion describes signals as being "asserted". A signal may be defined as being asserted when it conveys a value indicative of a particular piece of information. A particular signal may be defined to be asserted when it conveys a binary one value or, alternatively, when it conveys a binary zero value.

Numerous variations and modifications will become apparent to those skilled in the art once the above disclosure is fully appreciated. It is intended that the following claims be interpreted to embrace all such variations and modifications.

What is claimed is:

1. A microprocessor, comprising:
a scheduler configured to issue operations; and
a load store unit coupled to receive memory operations issued by the scheduler and configured to execute the memory operations;
wherein the load store unit is configured to store information identifying a plurality of memory operations issued to the load store unit, wherein in response to detection of incorrect data speculation that is based on a prediction that was made within the microprocessor for one of the plurality of memory operations, the load store unit is configured to provide a replay indication to the scheduler indicating that at least one of the plurality of memory operations within the load store unit should be reissued;
wherein the scheduler is configured to reissue the at least one of the plurality of memory operations in response to the indication from the load store unit.

2. The microprocessor of claim 1, wherein the load store unit is configured to generate the replay indication by identifying each of the plurality of memory operations having an address matching an address of the one of the plurality of memory operations.

3. The microprocessor of claim 1, wherein the load store unit is configured to generate the replay indication by identifying each of the plurality of memory operations having an address matching either a speculative value of an address of the one of the plurality of memory operations or a new value of the address of the one of the plurality of memory operations.

4. The microprocessor of claim 1, wherein the load store unit is configured to generate the replay indication by identifying each of the plurality of memory operations which are load operations and which have an address matching an address of the one of the plurality of memory operations.

5. The microprocessor of claim 1, wherein the load store unit is configured to track which load operations included in the plurality of memory operations have forwarded data from store operations; and wherein if an address of a store operation is detected as being incorrectly speculated, the load store unit is configured to generate the replay indication by identifying any younger ones of the load operations which forwarded data from the store operation.

6. The microprocessor of claim 1, wherein the load store unit is configured to generate the replay indication by identifying each of the plurality of memory operations occurring before the one of the plurality of memory operations in program order.

7. The microprocessor of claim 1, wherein the load store unit is configured to generate the replay indication by identifying the one of the plurality of memory operations for which incorrect data speculation was detected.

8. The microprocessor of claim 1, wherein the load store unit is configured to detect the incorrect data speculation by comparing a speculative value of an address of the one of the plurality of memory operations to a new value of the address of the one of the plurality of memory operations.

9. The microprocessor of claim 1, wherein the load store unit is configured to detect the incorrect data speculation by comparing a speculative result of a load operation to a non-speculative result of the load operation.

10. A computer system, comprising:
a memory; and
a processor coupled to the memory, wherein the processor comprises:
a scheduler configured to issue memory operations; and
a load store unit coupled to receive memory operations issued by the scheduler and configured to execute the memory operations;
wherein the load store unit is configured to store information identifying a plurality of memory operations issued to the load store unit, wherein in response to detection of incorrect data speculation that was performed within the processor for one of the plurality of memory operations, the load store unit is configured to provide a replay indication to the scheduler indicating that at least one of the plurality of memory operations within the load store unit should be reissued;
wherein the scheduler is configured to reissue the at least one of the plurality of memory operations in response to the indication from the load store unit wherein the scheduler is separate from the load store unit.

11. A method, comprising:
a scheduler issuing an operation to a load store unit for execution;
the load store unit detecting that data speculation performed on the operation is incorrect wherein the load store unit is separate from the scheduler;
in response to said detecting, the load store unit generating a replay indication identifying at least one operation currently issued to the load store unit;
in response to said generating, the scheduler reissuing the at least one operation to the load store unit.

12. The method of claim 11, wherein said generating comprises the load store unit generating one or more replay indications identifying all outstanding operations within the load store unit that are younger than the operation for which the data speculation is incorrect.

13. The method of claim 11, wherein said generating comprises the load store unit generating one or more replay indications identifying any outstanding operation within the load store unit having an address matching an address of the operation for which the data speculation is incorrect.

14. The method of claim 11, wherein said generating comprises the load store unit generating one or more replay indications identifying any outstanding operation within the load store unit having an address matching a speculative value of an address of the operation for which the data speculation is incorrect.

15. The method of claim 11, further comprising tracking which load operations outstanding within the load store unit have forwarded data from an older store operation; and wherein if data speculation performed on an address of the older store operation is identified as being incorrect by the indication, said generating comprises the load store unit generating one or more replay indications identifying any of the load operations which forwarded data from the older store operation.

16. The method of claim 11, wherein said generating comprises the load store unit generating the replay indication identifying the operation for which the data speculation is incorrect.

17. The method of claim 11, wherein said detecting comprises the load store unit comparing a speculative value of an address of the operation to a new value of the address of the operation.

18. The method of claim 11, wherein said detecting comprises comparing a speculative result of the operation to a non-speculative result of the operation.

* * * * *